United States Patent [19]

Fukumura et al.

[11] Patent Number: 4,621,428

[45] Date of Patent: Nov. 11, 1986

[54] PEN TIP CLEANING ASSEMBLY OF PLOTTER

[75] Inventors: Sadaaki Fukumura; Etsuji Tagami, both of Tokyo; Takeji Hashimoto; Hirofumi Tano, both of Kyoto, all of Japan

[73] Assignees: Iwatsu Electric Co., Ltd., Tokyo; Dainippon Screen Mfg. Co., Ltd., Kyoto, both of Japan

[21] Appl. No.: 693,395

[22] Filed: Jan. 22, 1985

[30] Foreign Application Priority Data

Feb. 14, 1984 [JP] Japan ............................. 59-19701[U]

[51] Int. Cl.$^4$ .............................................. G01D 9/00
[52] U.S. Cl. ................... 33/18.1; 15/236 A; 15/244 R; 346/140 R
[58] Field of Search ................... 33/18 R; 346/140 R; 15/244 R, 236 A

[56] References Cited

U.S. PATENT DOCUMENTS

| 2,923,020 | 2/1960 | Fluster | 15/244 R X |
| 3,039,438 | 6/1962 | Brown | 346/140 R |
| 3,609,791 | 10/1971 | Siegel et al. | 15/236 A |
| 3,730,975 | 5/1973 | Kono et al. | 346/140 R X |
| 4,097,874 | 6/1978 | Anderka et al. | 346/140 R |
| 4,176,778 | 12/1979 | Fortune | 15/236 A |
| 4,455,751 | 6/1984 | Held | 33/18 R |

Primary Examiner—William D. Martin, Jr.
Attorney, Agent, or Firm—Martin A. Farber

[57] ABSTRACT

A pen tip cleaning assembly of a plotter for performing drawing with a drawing needle pen held by a pen carriage, is provided wherein a two-dimensional pad of an elastic material is disposed in a drawing surface so as to allow insertion of a pen tip of the drawing needle pen, and the pen tip is moved relative to the two-dimensional pad, whereby the pen tip is cleaned every time the pen tip is inserted in a clean portion of the two-dimensional pad.

12 Claims, 3 Drawing Figures

PEN TIP CLEANING ASSEMBLY OF PLOTTER

BACKGROUND OF THE INVENTION

The present invention relates to an improvement of such plotters as use various kinds of pens and, more particularly, to a pen tip cleaning assembly for a drawing needle pen.

In a conventional plotter used in computer graphics or the like, various kinds of felt pens, ball-point pens, or drawing needle pens are prepared in a pen socket, and one of the pens is selected and held by a pen carriage so as to perform drafting. Especially, in such a plotter as is used for framing in newspapers, magazines or the like, a drawing needle pen must be able to draw very thin lines of 0.1 to 0.3 mm in width.

In a very thin drawing needle pen, when paper dust or foreign material becomes adhesive to a pen tip during drawing, or the pen tip tends to dry, ink is solidified at the pen tip. Due to this the pen becomes scratchy and the line thickness becomes irregular, and in a worst case, lines are not drawn at all. For these reasons, after drawing is performed for a predetermined period of time, the drawing operation must often be interrupted to remove paper dust and solidified ink from the pen tip by wiping it by cleaning paper. However, when simple manual cleaning is performed by an operator, the recording paper easily becomes soiled during the drawing operation. A cleaning operation requires skill and as a result, the pen tip cannot be sufficiently cleaned by manual operation. Furthermore, the operator may fail to clean the pen tip at a proper time, resulting in scratchy lines.

SUMMARY OF THE INVENTION

It is an object of the present invention to provide a cleaning assembly capable of automatically or manually cleaning a pen tip during drawing by a plotter.

Another object of the invention is to provide a cleaning assembly suitable for a drawing needle pen.

According to an advantageous feature of the present invention, the cleaning assembly comprises an elastic pad adaptable to insert a pen tip therein. The pad comprises an elastic material, e.g., neoprene sponge, which is suitable to strip or remove dust and foreign materials stuck to the pen tip when the pen tip is inserted into and drawn out from the pad. The pad has elastic and hermetic properties so as to be easily inserted thereinto.

The pad is arranged on a drawing plane of a plotter and next to the effective area within which desired figures or drawings are drawn. A carriage by which a drawing needle pen to be used is held, is moved to the pad so as to insert the pen tip at a different position every insertion.

The pad is detachably fixed on the drawing plane, to which the drawing needle pen is moved for insertion. And, alternatively, the pad is rotatably mounted on the drawing plane, to which the drawing needle pen is moved and simultaneously the pad itself rotates for inserting at a different position.

The above and further objects and novel features of the invention will more fully apparent from the following detailed description when the same is read in connection with the accompanying drawings. It is to be expressly understood, however, that the drawings are for purpose of illustration only and are not intended as a definition of the limits of the invention.

DETAILED DESCRIPTION OF THE PREFERRED EMBODIMENTS

Figure 1:
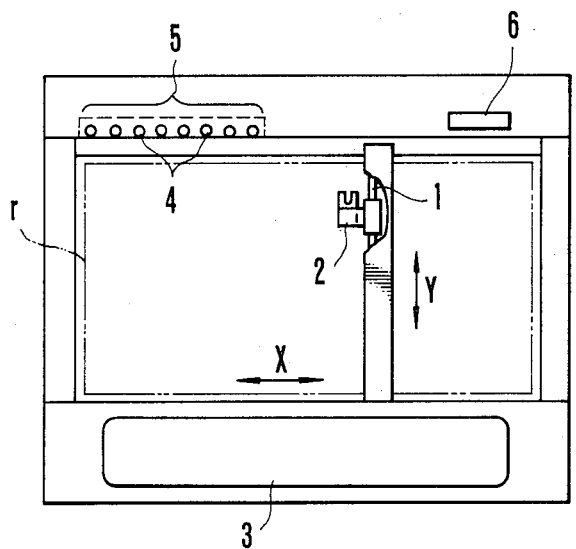
FIG. 1 is a plan view showing the overall configuration of an embodiment of the present invention.

Referring to FIG. 1, there is provided a guide rod 1 moved by a steel belt (not shown), in directions indicated by arrow X, which is driven by a servo-motor (not shown). A pen carriage 2 is slidably supported on the guide rod 1 and is fed in directions indicated by arrow Y, by means of a wire which is driven by another servo-motor (not shown). The coordinates of the pen carriage 2 are designated by addresses from e.g. a computer (not shown), thereby the pen carriage 2 is automatically moved as desired in accordance with the addresses. A detailed explanation of the above mentioned construction and operation will not be needed, since these are not the subject matter of the present invention. An image is drawn within an effective area $\gamma$ indicated by an imaginary line. A pen socket 5 is arranged beside the effective area $\gamma$ of the upper surface 3 of a plotter so as to store a plurality of recording pens 4. A predetermined recording pen 4 is picked up and held by the pen carriage 2 to draw desired lines in accordance with instructions from the computer.

Figure 2:
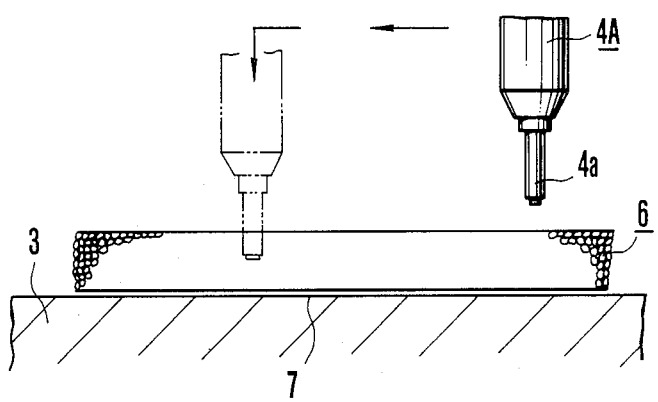
FIG. 2 is an enlarged vertical sectional view of the main part in FIG. 1.

According to this embodiment, a rectangular elastic pad 6 is located next to the effective area $\gamma$ of the upper surface 3. A pen tip 4a of a drawing needle pen 4A is inserted into the pad 6. As shown in FIG. 2, the pad 6 is detachably fixed e.g. by a two-side adhesive tape 7 or the like on the upper surface. The pad 6 has a thickness such as not to permit the pen tip 4a to pierce through the pad 6. The pad 6 comprises for example a rectangular-shaped block of neoprene sponge. Of course, another pad can be used. The pen tip 4a can be inserted into the pad 6 at a different position every time. That is, in a cleaning mode to which a drawing mode is switched over by manual operation or by instructions from the computer, the drawing needle pen 4A held by carriage 2 is moved to a predetermined position of the pad 6, as indicated by solid line in FIG. 2 and is further moved within a horizontal plane in accordance with a random table for determining the position of the pen tip 4a with respect to the pad 6. Thereafter, the pen tip 4a is inserted into the pad 6 once or more times. Paper dust and solidified ink which is attached to the pen tip 4a is stripped and removed by the elastic material constituting the pad 6.

Figure 3:
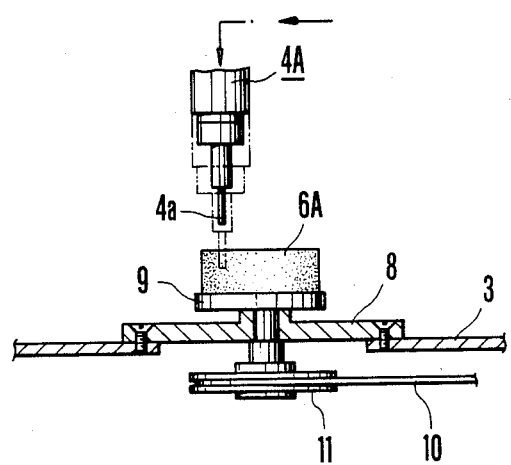
FIG. 3 is a sectional view showing a second embodiment.

FIG. 3 shows a second embodiment of the present invention. In this embodiment, a disk-like pad 6A is used in place of the rectangular pad 6 of the first embodiment. The pad 6A is fixed on a rotary disk 9 rotatably mounted on a mounting plate 8. The rotary disk 9 is rotated by a pulley 11 on which a wire 10 is looped, the wire 10 being irregularly driven in accordance with instructions from the computer, so that the angular stop position of the pad 6A is not specified. Therefore, after the drawing needle pen 4A is moved to a specific eccentric position above the pad 6A in the cleaning mode, as indicated by the solid line in FIG. 3, the drawing needle pen 4A is vertically moved to clean the pen tip 4a by effectively utilizing the whole surface of the pad 6A.

It will be apparent from the above description that the pen tip is automatically inserted into the pad before and during drawing, so that the pen tip is always kept clean. Scratchy lines or disconnected lines will not be drawn, thereby obtaining a clear image.

What is claimed is:

1. A device for cleaning a pen tip of a drawing needle pen, comprising:

a carriage for holding said needle pen thereon, said carriage being movable in X-Y directions relative to a drawing area within which marking is made;

an elastic pad in which said pen tip is insertable therein, said pad being located at a predetermined place outside of the drawing area;

means for moving said carriage and conducting said needle pen to above said pad; and means for altering the insertional position of said pen tip relative to said pad for every insertion, means for vertically moving said pen tip relative to said pad, such that the insertion of said pen tip is made at different positions of said pad upon every insertion, said pen tip being vertically movable within said pad, whereby foreign materials adhering to said pen tip are removed and the pen tip is cleaned upon insertion of the pen tip into said pad.

2. The device according to claim 1, wherein said elastic pad is detachably fixed at a predetermined place outside the drawing area.

3. The device according to claim 1, wherein said elastic pad is mounted on a rotatable disk outside the drawing area.

4. The device according to claim 1, wherein said elastic pad is a neoprene sponge.

5. The device according to claim 1, wherein said moving means first moves said carriage to a predetermined position above said pad and then said altering means further moves said carriage above said pad in accordance with a random table.

6. The device according to claim 5, wherein said altering means includes a computer in which said random table is stored.

7. A device for cleaning a pen tip of a drawing needle pen, comprising a carriage for holding said needle pen thereon, said carriage being mounted movably in X-Y directions relative to a drawing plane, a pad of elastic material in which said pen tip is insertable therein, said pad being detachably fixed on the drawing plane next to a drawing area thereof, means for moving said carriage for conducting the drawing needle pen to a different position above the pad every time the drawing needle pen is moved over the pad, so as to provide an insertional position of said pen tip relative to said pad such that the insertional position is changed for every insertion, means for inserting and withdrawing the pen tip into and from said pad, respectively, at said respective insertional position, whereby foreign materials adhering to said pen tip are removed and the pen tip is cleaned every time the pen tip is inserted into a clean non-previously inserted portion of said pad.

8. The device according to claim 1, wherein said moving means moves said carriage above said pad to said insertional positions in accordance with a random movement.

9. The device according to claim 7, wherein said pad is a neoprene sponge.

10. A device for cleaning a pen tip of a drawing needle pen, comprising a carriage for holding said needle pen thereon, said carriage being movable in X-Y directions relative to a drawing plane, a pad of elastic material in which said pen tip is insertable therein, a rotatable disk located on the drawing plane next to a drawing area thereof, said pad being mounted on said rotatable disc, first means for conducting said drawing needle pen to at least one position above said pad, second means for irregularly rotating and stopping said rotatable disk so that an insertional position of said pen tip relative to said pad is altered and different for each insertion of the pen tip into the pad, said first means further for inserting and withdrawing said pen tip into and from said pad, respectively, whereby foreign materials adhering to said pen tip are removed and the pen tip is cleaned every time the pen is inserted into a clean non-previously inserted portion of said pad.

11. The device according to claim 10, wherein said pad is detachably fixed to the rotatable disk.

12. The device according to claim 11, wherein said pad is a neoprene sponge.

* * * * *